UNITED STATES PATENT OFFICE.

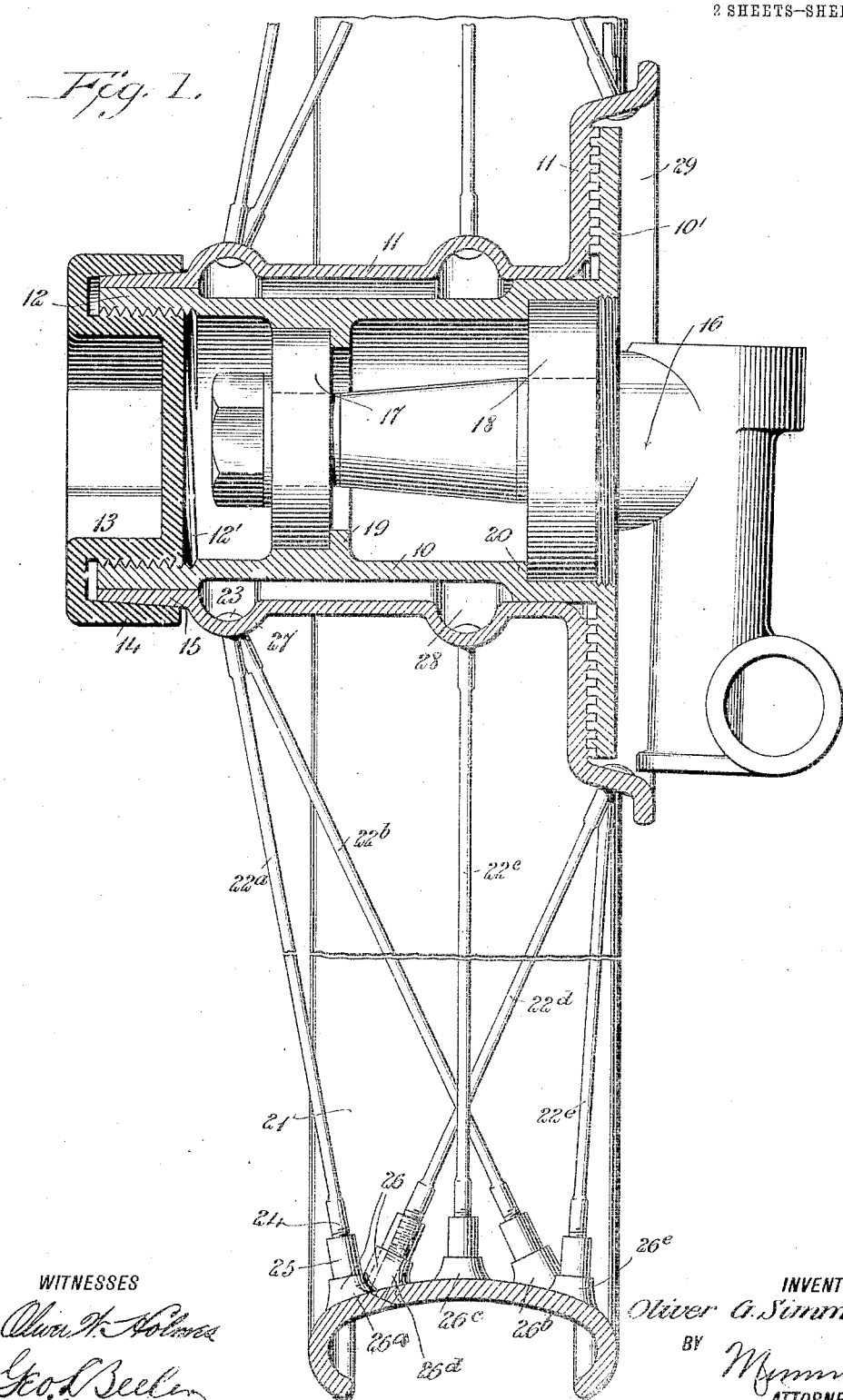

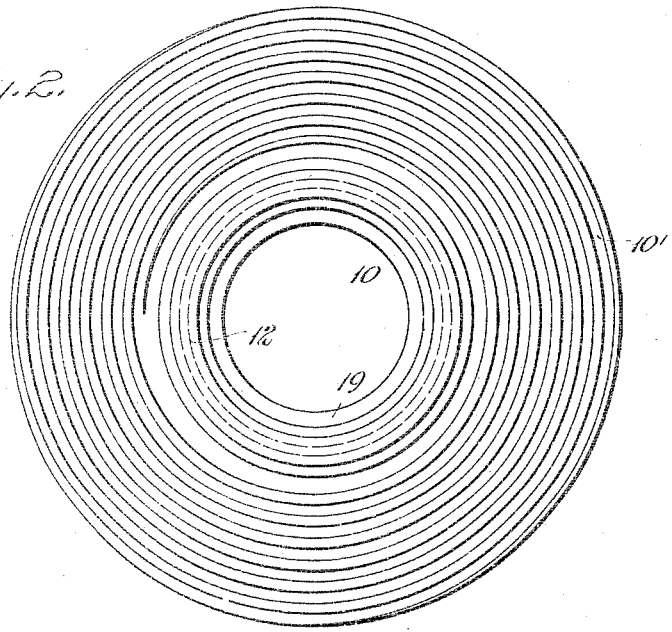
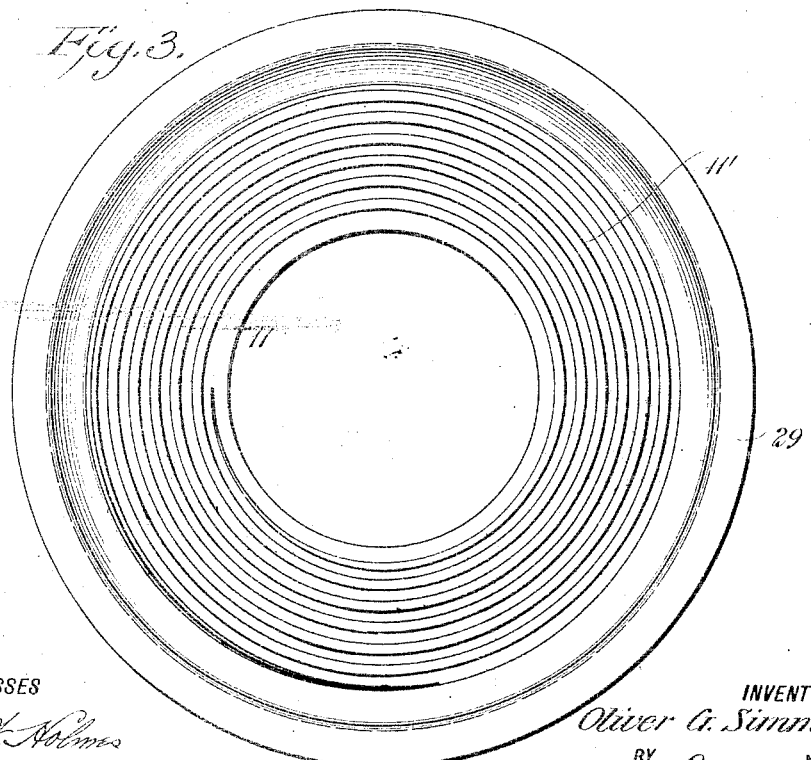

OLIVER C. SIMMONS, OF SAN ANTONIO, TEXAS.

METAL WHEEL.

1,099,770.

Specification of Letters Patent.    Patented June 9, 1914.

Application filed October 25, 1913.   Serial No. 797,204.

*To all whom it may concern:*

Be it known that I, OLIVER GEORGE SIMMONS, a citizen of the United States, and a resident of San Antonio, in the county of Bexar and State of Texas, have invented a new and Improved Metal Wheel, of which the following is a full, clear, and exact description.

This invention relates to vehicle wheels and has particular reference to wheels constructed of metal or at least with metal hubs or spokes.

Among the objects of the invention is to provide a hub for a wheel adapted especially for automobile practice, said hub comprising an inner member designed to be permanently secured to the axle or its equivalent, and an outer hub removable with the spokes and rim bodily from the inner member without disturbing the position or adjustment of the inner member.

A further object of the invention is to improve the construction of the hub whereby it is made stiffer and stronger and better adapted for the use of metal spokes than similar devices heretofore proposed.

The foregoing and other objects of the invention will hereinafter be more fully described and claimed and illustrated in the drawings forming a part of this specification in which like characters of reference indicate corresponding parts in all the views, and in which—

Figure 1 is a vertical section of a hub with fragments of the spokes and rim indicating a preferred embodiment of this invention; and Figs. 2 and 3 are end views of the several hub members.

The several parts of the device may be made of any suitable materials, and the relative sizes and proportions, as well as the general design of the mechanism, may be varied to a considerable extent without departing from the spirit of the invention hereinafter more fully set forth and specifically claimed.

Referring more particularly to the drawings I show a hub comprising principally two parts, namely, an inner member 10 and an outer member 11, the one fitted snugly within the other. The main portions of these hub parts are substantially cylindrical as to general configuration and at their inner ends they are provided with flanges 10′ and 11′ respectively, shown herein as being vertical. These flanges are arranged so as to occupy planes perpendicular to the axis of the hub and the two flanges are fitted snugly against each other and there interlocked by some suitable means for the purpose of stiffening the hub and resisting all tendency of the two hub parts to move with respect to each other in any direction except for the purpose of direct separation of the outer hub member longitudinally from the inner member. The adjacent faces of the two flanges 10′ and 11′ are provided with spiral threads as shown in Figs. 2 and 3, the spiral of one member being left handed and adapted to fit snugly into the thread groove of the other member, the spiral of the latter member being right handed as viewed in the same direction as the other. The cross-sectional form of the spiral threads may vary according to individual tastes or requirements, but I prefer that the threads be made substantially square for the purpose of better taking care of all stresses than if the threads were otherwise formed. It will be apparent that in the assembling of the hub, the outer member 11 will slip freely upon the inner member, and the two spirals will nest snugly together when the two hub members are in proper circumferential relative adjustment.

The outer end 12 of the inner hub member is provided with screw threads 12′ for the accommodation of a nut 13 adapted to screw thereinto and provided with an outside flange 14 overlapping the outer end 15 of the outer hub member. The coöperating faces of the nut and said part 15 are tapered as shown in Fig. 1 so as to increase the clamping effect upon the hub members and between such members and the nut. The interior of the nut is preferably hexagonal for the accommodation of a wrench for manipulating it. The character of the threads 12′ of the hubs on opposite sides of the vehicle is preferably right or left handed according to the requirements in practice. It is apparent that the outer hub may be easily removed from the inner hub simply by the removal of the nut 13, and the same hub or another as easily replaced for the purposes of repair or otherwise.

The inner hub is mounted upon and secured to any suitable form of axle or steering head 16 preferably by ball bearings 17 and 18 clamped respectively against a flange 19 and a shoulder 20 whereby the inner hub is or may be secured substantially permanently in place. These ball bearing devices not constituting any part of this invention *per se* and not specifically illustrated, it is thought that further description thereof would be out of place.

The wheel rim 21 herein shown as made of metal is connected with the outer hub member 11 by a plurality of series of metal or wire spokes. I prefer for this purpose the employment of five of such series and indicated at 22$^a$ to 22$^e$ inclusive. For an ordinary automobile wheel I prefer to use approximately fifteen spokes to each series, but it is to be understood that this number is expressed as illustrative rather than as a limitation. These spokes are made as heretofore with heads 23 and threaded ends 24 coöperating with nipples 25 operating in sockets 26 at the rim. The spokes 22$^a$ and 22$^b$ have their heads extending preferably from the same annular portion 27 of the hub and extend thence respectively to the outer and inner edges of the rim and there secured to the lugs 26$^a$ and 26$^b$ respectively, the spokes 22$^b$ therefore passing the middle plane of the wheel. The spokes 22$^c$ substantially coincide with the said middle plane of the wheel and extend from the annular portion 28 of the outer hub-member to attachment lugs 26$^c$ at the center of the rim. The inner end of the outer hub 11 is provided with a stiffening and strengthening flange 29 constituting an extension at the outer edge of the plane face 11', this flange 29 constituting a means to support or connect the other two series of spokes 22$^d$ and 22$^e$ which extend thence into engagement with attachment lugs 26$^d$ and 26$^e$ respectively. The last series of spokes are connected adjacent the inner edge of the rim and the spokes 22$^d$ extend across the middle plane of the wheel and are secured adjacent the outer edge of the rim. The spokes 22$^b$ and 22$^d$ cross one another substantially in the central plane of the wheel.

Having thus described my invention, I claim as new and desire to secure by Letters Patent:—

1. In a wheel hub, the combination of inner and outer members and means to secure the hub members detachably together, said means including a pair of flanges formed upon the inner and outer hub members respectively and having interlocking right and left hand spirals on their adjacent faces.

2. The combination of an inner hub member having an outwardly projecting integral flange provided on its outer face with a spiral thread, an outer hub member slidably fitted upon the inner hub member and provided on its inner end with an outwardly projecting integral flange having on its inner face a spiral thread formed as a counterpart of the aforesaid spiral thread and meshing therewith, said counterpart spirals serving to prevent relative rotation between the hub members, and means to normally prevent the outward separation of the outer hub member from the inner hub member.

3. The herein described wheel construction comprising, in combination, an inner hub member, means to secure said member in place for operation, said member having an outwardly projecting flange having a spiral arranged thereon of a certain character, an outer hub member slidable longitudinally and bodily upon the inner hub member and having an outwardly projecting flange provided with a spiral of a different character interlocking with the inner hub member flange spiral to prevent relative rotation of the hub members, and a member detachably secured to the inner hub member and having direct engagement with the outer hub member to prevent longitudinal movement of the outer hub member in practice and serving to maintain the aforesaid flanges in interlocking engagement with each other.

In testimony whereof I have signed my name to this specification in the presence of two subscribing witnesses.

OLIVER G. SIMMONS.

Witnesses:
CHAS. A. BEATTY,
ERNST W. F. HERRMANN.